INVENTOR
DAVID E. J BUCKINGHAM

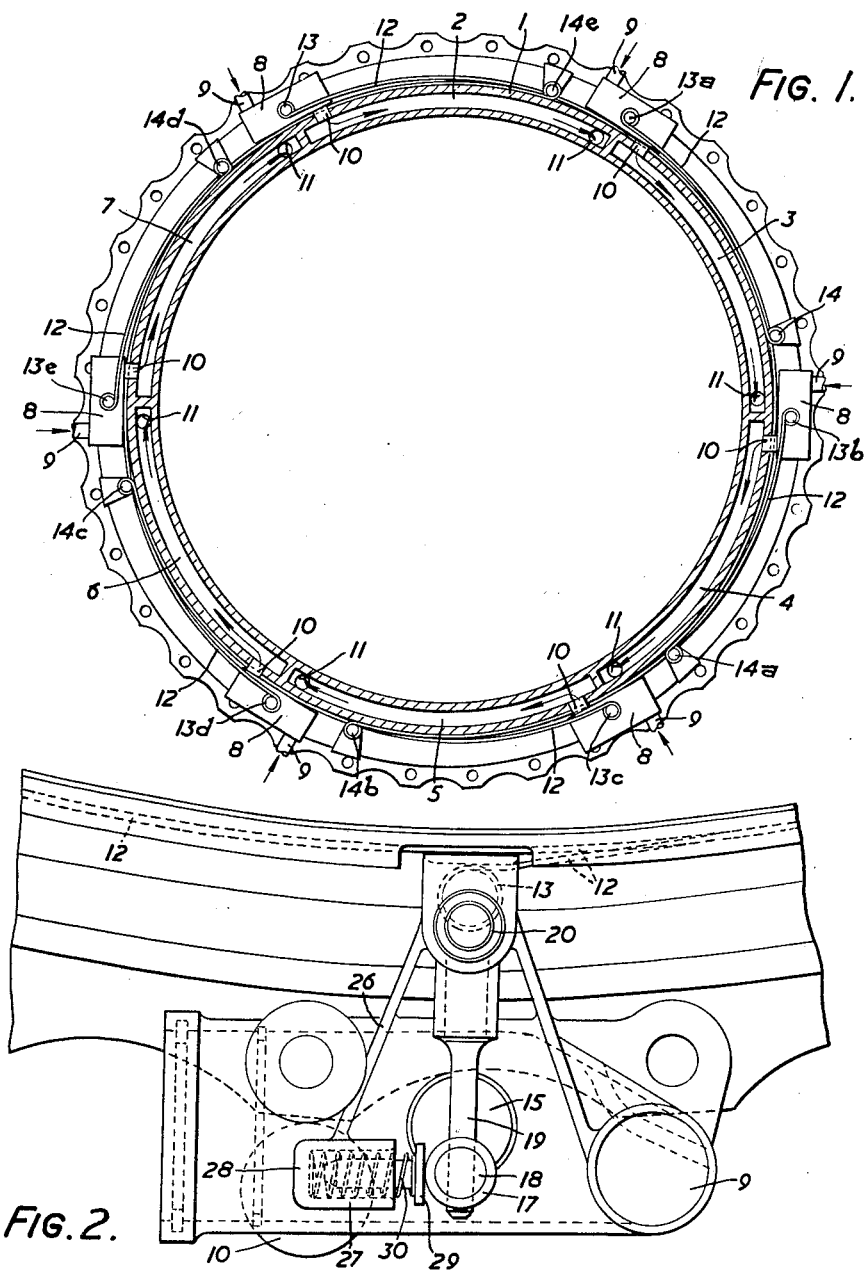

BY
Watson, Cole, Grindle & Watson
ATTORNEYS 3,029,064
TEMPERATURE CONTROL APPARATUS FOR
TURBINE CASES
David Edwin James Buckingham, London, England, assignor to D. Napier & Son Limited, London, England, a company of Great Britain
Filed July 1, 1959, Ser. No. 824,264
Claims priority, application Great Britain July 11, 1958
4 Claims. (Cl. 253—39.1)

This invention relates to apparatus for controlling the temperature of the casing of a turbine employing hot working fluid and more particularly of a combustion turbine.

One of the requirements if a turbine is to have high efficiency is that the blade tip clearance, that is to say the clearance between the tips of the rotor blades and the surrounding casing, should be maintained as small as possible. Allowance has to be made, however, for differential thermal expansion between the parts of the rotary assembly and the casing and also for distortion which may occur due to temperature differences at different circumferential points around the casing.

Various proposals have been made to provide air cooling for the turbine casing by providing a cooling chamber or series of cooling air chambers extending circumferentially around the casing and means for causing the air flow through such chamber or chambers, such chamber or chambers usually being formed within the appropriate part of the outer main wall of the casing by a so-called shroud ring assembly, which may be in one piece or built up from a series of sections, and lies adjacent to the blade tips. For convenience in the present specification, therefore, the turbine casing will be regarded as including any such shroud ring assembly or similar parts which form the cooling chamber or chambers or a part or parts of such chamber or chambers.

Apparatus according to the present invention for controlling the temperature of the casing of a turbine employing a hot fluid and including at least one cooling air chamber extending circumferentially of the casing, comprises means for controlling the flow of cooling air through said cooling air chamber at least one temperature-responsive device arranged to be responsive to temperature changes in the part of the casing adjacent to the cooling air chamber, and control means controlled by said temperature-responsive device and arranged to control the cooling air flow through the said chamber and hence the temperature of the said part of the turbine casing.

Preferably the turbine casing comprises a series of cooling air chambers disposed circumferentially around the casing, two or more cooling air passages each arranged so that the cooling air flowing through any one of them flows also through one or more of the cooling air chambers which extend around a section only of the circumference of the casing and two or more temperature-responsive devices each arranged to be responsive to the temperature of the part of the casing constituting a section only of the circumference of the casing and to control the air flow through the cooling air passage associated with the chamber or chambers extending around that section.

The apparatus in this form thus provides for the separate control in accordance with requirements of the temperature of each of two or more angularly displaced circumferential parts or sections of the turbine casing and thus tends to ensure not only against undesirable differences in the mean thermal expansion respectively of the casing and the blades causing undesirable changes in the mean tip clearance of the blades, but also tending to ensure against any local distortion of the casing such as would alter locally the tip clearance of the blade without necessarily materially affecting the mean tip clearance.

Preferably in the arrangement employing two or more cooling air passages referred to above these passages constitute delivery passages by which cooling air is delivered, for example from the air-compressing part of the combustion turbine, and the control means comprise throttle valves arranged respectively in such passages and each controlled by the appropriate temperature-responsive device.

The form of temperature-responsive devices used and their arrangement in accordance with the present invention may vary considerably but one arrangement according to the invention is shown by way of example, and partly diagrammatically, in the accompanying drawings, in which:

FIGURE 1 is a somewhat diagrammatic cross-section of a turbine casing in a plane normal to the axis of the casing and at a point in the length of the casing at which in the assembled turbine it will intersect one of the discs carrying a ring of rotor blades.

FIGURE 2 is an enlarged view from the same direction as FIGURE 1 of one of the valve assemblies and its associated parts as used in the construction shown in FIGURE 1.

Figure 4:
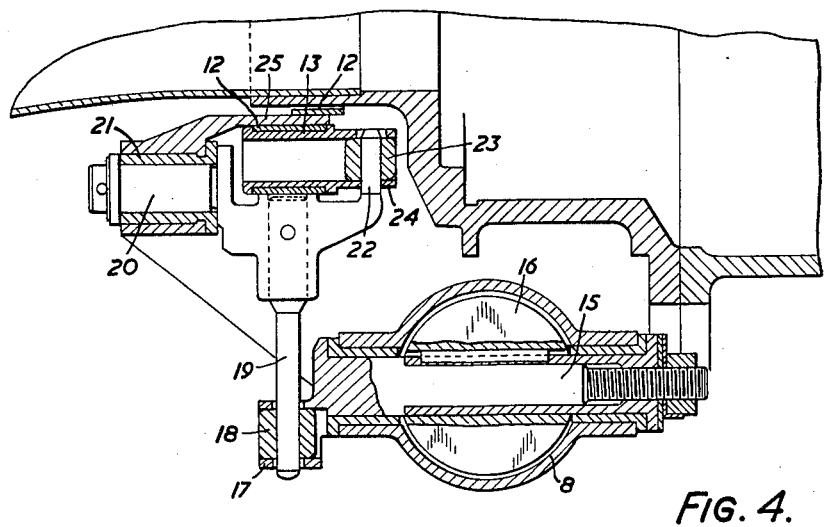
FIGURE 4 is a cross-section on the line IV—IV of FIGURE 2.

With the arrangement somewhat diagrammatically shown in FIGURE 1 the turbine casing is formed to provide opposite the tips of a ring of rotor blades a double walled casing 1 constituting in effect an air-cooled shroud ring comprising a series of air cooling chambers 2, 3, 4, 5, 6, 7 disposed circumferentially around the casing as shown so that each chamber extends around a part of the circumference of the casing. It is to be understood that the construction embodying the series of circumferentially disposed chambers is only diagrammatically shown in FIGURE 1 for convenience since the details of construction of the casing to provide the circumferentially extending chambers in itself constitutes no part of the invention.

Arranged at equal circumferential intervals around the casing 1 are six valve assemblies each indicated generally in FIGURE 1 by the reference numeral 8, each valve assembly 8 having a cooling air inlet passage indicated at 9 to which cooling air can be supplied in known manner from any convenient source of cooling air such as an appropriate stage in the compressor of the turbine of a forwardly facing air inlet on an aircraft in which the turbine is installed, and an air delivery passage 10 leading from the valve assembly into one end of one of the adjacent cooling air chambers 2 to 7. The other end of each of these chambers 2 to 7 communicates with an outlet passage 11 by which the cooling air escapes from the chamber and may be led in known manner into the working chamber of the turbine so as to pass away with the working fluid.

Associated with each of the valve assemblies and arranged to operate the valves of such assemblies in a manner more fully described hereafter, is a steel band 12 which extends from a pin 13, 13a, 13b, 13c, 13d, 13e on its associated valve assembly, around an arc of the casing 1 such that it lies in contact with the outer wall of the casing over a substantial part of the circumferential length of one of the cooling air chambers 2 to 7 and also over a substantial part of the circumferential length of the next adjacent cooling air chamber. Thus in the arrangement shown in FIGURE 1 the bands extend respectively from the pin 13 to an anchoring pin 14 on the casing, from the pin 13a to an anchoring pin 14a on the casing, from the pin 13b to an anchoring pin 14b on the casing, from the pin 13c to an anchoring pin 14c on the casing, from the pin 13d to the anchoring pin 14d on the casing, and from the pin 13e to the anchoring pin 14e on the casing.

The casing is assumed to be formed of aluminum alloy or magnesium alloy and under the influence of temperature changes due to different working conditions therefore expands and contracts to a greater degree than the steel bands 12. The relative expansion and contraction of the bands and the casing which thus occurs is used to operate the valves (hereinafter more fully described) in the valve assemblies 8.

Figure 3:
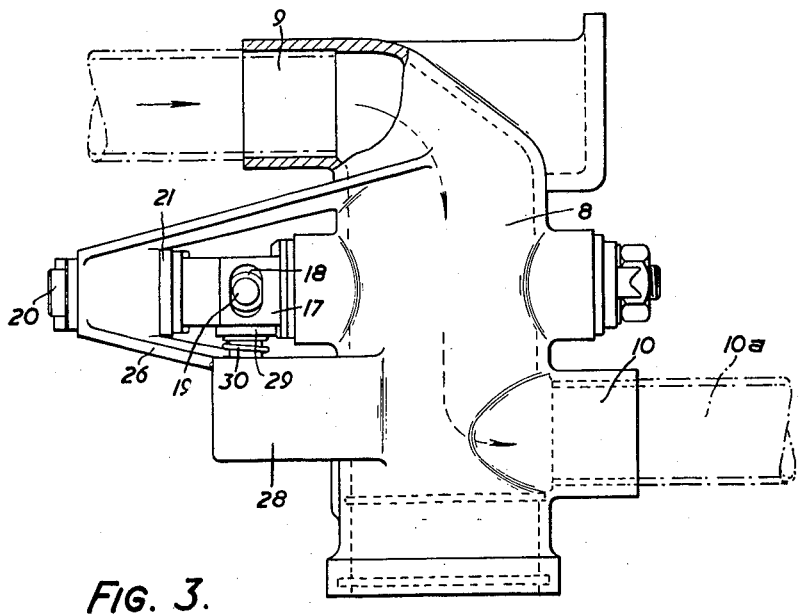
FIGURE 3 is an underneath plan view partly in section of the valve assembly shown in FIGURE 2.

To this end each valve assembly, as shown in FIGURES 2, 3 and 4, comprises a casing of generally tubular form having its inlet passage 9 at one end and its outlet passage 10 near its other end. The outlet passage 10 would be connected by pipes 10a respectively to the appropriate chambers 2, 3, 4, 5, 6 and 7, the direct connection indicated in FIGURE 1 being shown only for convenience of diagrammatic illustration.

Extending across the tubular casing 8 so as to be capable of oscillating therein is a spindle 15 carrying a butterfly valve 16 by which communication between the inlet passage 9 and the outlet passage 10 is thus controlled. The spindle 15 is provided at one of its exposed ends with a cylindrical socket 17 having its axis parallel to but displaced from the axis of the spindle, in which socket lies a bearing block 18 which can rock in the socket and has a diametral bore through which extends, freely but with a close working fit, a pin 19 constituting one part of an operating lever, the pin 19 extending through oval holes in the wall of the socket 17 so as to permit of the necessary movement. The lever of which the pin 19 forms a part is pivoted to the casing 8 by means of a pivot pin 20 engaging a bearing 21 secured to the casing and has a second arm 22 engaging a bore in a cylindrical bearing block 23 in the tubular pin 13, 13a, 13b, 13c, 13d or 13e, of the valve assembly, this pin for convenience being assumed in FIGURES 2, 3 and 4 to be the pin 13. The part carrying the bearing 21 is provided with a guide plate 25 by which the movement of the hollow pin 13 under the action of its associated band 12 is controlled so that it transmits an appropriate movement to the lever 22, 19 about its pivot pin 20.

Rigid with the casing 8 is a supporting bracket 26 having formed therein a cylindrical socket 27 having a closed inner end 28 and an open outer end facing the socket 17, as shown in FIGURE 2. The socket 27 forms a guide and partial housing for a pin 29 acted upon by a spring 30 to maintain its end always in engagement with the socket 17 and thus apply a force to the lever 19, 22 maintaining its associated band 12 in tension. Thus, in FIGURE 2 as the band 12 contracts relatively to the casing it permits the socket 17 to move to the right under the action of the spring-pressed pin 29 and vice versa.

The arrangement is such that increases in the mean temperature of the part of the casing in contact with which any band 12 lies thus results in that band contracting relatively to (i.e. expanding less than) the casing and opening the associated butterfly valve 16 to permit flow of additional cooling air through its associated cooling chamber. The overlap between adjacent bands, in addition, ensures that the control of each butterfly valve is not solely in accordance with temperature changes in the next adjacent cooling air chamber, with the result that the arrangement tends to maintain even cooling throughout the whole circumference of the casing.

What I claim as my invention and desire to secure by Letters Patent is:

1. A turbine using hot working fluid and including a rotor, a casing surrounding the turbine rotor and formed to provide at least one cooling air chamber extending circumferentially of said casing and having an inner wall adjacent the turbine rotor and an outer wall displaced therefrom, means for delivering cooling air to said chamber, valve means for varying the flow of cooling air through said chamber, valve control means located outside said outer wall and an operative connection between said valve control means and said valve means, and at least one temperature-responsive device in heat-conducting association with said outer wall and acting on said valve control means to vary the setting of said valve means in dependence upon the temperature of said outer wall.

2. A turbine using hot working fluid and including a rotor, a casing surrounding the turbine rotor and formed to provide a plurality of cooling air chambers extending in series circumferentially of the casing, each chamber having an inner wall adjacent the turbine rotor and an outer wall radially displaced therefrom, cooling air passages communicating respectively with the said chambers and with a souce of supply of cooling air, control valves controlling the air flow through the respective cooling air passages and chambers, valve control means located outside said outer wall and operatively connected to said control valves for individual control of said control valves, and temperature-responsive devices in heat-conducting association with said outer wall and connected to said respective valve control means, each of said temperature-responsive devices being at least in part in heat-conducting association with that section of the outer wall which bounds the chamber through which its associated valve controls the air flow.

3. A turbine as claimed in claim 2, in which each of said temperature-responsive devices comprises a metallic band extending in heat-conducting contact with said outer wall, connected at one end to said outer wall and connected at its other end to said valve control means, said metallic band being formed of a metal having a different co-efficient of expansion from that of said outer wall.

4. Apparatus as claimed in claim 3, in which the metallic bands associated with the various valve control means overlap one another circumferentially of the casing.

References Cited in the file of this patent

UNITED STATES PATENTS

| | | |
|---|---|---|
| 2,787,440 | Thompson | Apr. 2, 1957 |
| 2,811,833 | Broffitt | Nov. 5, 1957 |
| 2,858,101 | Alford | Oct. 28, 1958 |
| 2,906,494 | McCarthy et al. | Sept. 29, 1959 |